United States Patent [19]

Filipiak et al.

[11] Patent Number: 5,193,090
[45] Date of Patent: Mar. 9, 1993

[54] ACCESS PROTECTION AND PRIORITY CONTROL IN DISTRIBUTED QUEUEING

[76] Inventors: Janusz Filipiak, 233 North Terrace, Adelaide, Australia, 5000; Leslie T. Berry; James Gordon, both of C/- Bond University Gold Coast, Queensland, 4229, Australia

[21] Appl. No.: 490,684
[22] PCT Filed: Jul. 14, 1989
[86] PCT No.: PCT/AU89/00300
§ 371 Date: Jun. 22, 1991
§ 102(e) Date: Jun. 22, 1991
[87] PCT Pub. No.: WO90/00841
PCT Pub. Date: Jan. 25, 1990

[30] Foreign Application Priority Data

Jul. 15, 1988 [AU] Australia .................. PI9326

[51] Int. Cl.$^5$ ........................................ H04L 12/56
[52] U.S. Cl. ........................ 370/94.1; 370/61; 370/85.1
[58] Field of Search ........... 370/94.1, 60, 61, 85.1, 370/85.6

[56] References Cited

U.S. PATENT DOCUMENTS

| | | | |
|---|---|---|---|
| 3,680,056 | 7/1972 | Kropfl | 340/172.5 |
| 4,021,653 | 5/1977 | Sharp et al. | |
| 4,354,248 | 10/1982 | Conger et al. | |
| 4,445,116 | 4/1984 | Grow | 370/85.5 |
| 4,460,806 | 7/1984 | Canniff et al. | |
| 4,500,989 | 2/1985 | Dahod | 370/85 |
| 4,510,601 | 4/1985 | Delpit et al. | |

(List continued on next page.)

FOREIGN PATENT DOCUMENTS 52100 7/1986 Australia .

OTHER PUBLICATIONS

Bell Communications Research, "Dual-Tone Multifrequency Receiver Generic Requirements for End-to--End Signaling Over Tandem-Switched Voice Links", TR-TSY-000181, Issue 1, Mar., 1987.

Bell Communications Research, "Customer Line Signaling", Section 6.2, TR-TSY-000064 LSSGR, Dec., 1984.

Bell System, "Bell System Pub. Switched Tel. Srvc. Interconnection Criteria for Domestic Pub. Land Mobile Radio Srvc, Domestic Pub. Cellular Telecommunications Srvc. & Maritime Radio Srvc.", Bell System Tech. Ref., No. 326-1987, Dec., 1981.

Bell System Tech. Ref., "Description of the Analog Voiceband Interface Between the Bell System Local Exchange Lines & Terminal Equipment", No. 326-125, Jan., 1983.

(List continued on next page.)

Primary Examiner—Douglas W. Olms
Assistant Examiner—T. Samuel
Attorney, Agent, or Firm—Baker, Maxham, Jester & Meador

[57] ABSTRACT

Access protection and priority control is performed in a network with distributed queueing by the use of counters and a memory. The counters accumulate a number of passing request bits, the number of packets waiting in a queue, request bits generated, busy bits changed by station, and the numbers of free packets which have passed the station on the communication medium. These request bits indicate that another station wishes to issue a data packet. The counters decrement when a free cell passes the station. The counters indicate a queue placing. The memory stores upper and lower threshold values. These threshold values are compared to the counter values to control the issuing of data packets from each station onto the medium. The imposed thresholds ensure that the bandwidth available to each station is maintained despite traffic load conditions, transmission rates, or length of the medium. This mechanism is applicable to the static and dynamic control of bandwidth usage of stations and nodes used in the I.E.E.E. 802.6 Draft Standard for Distributed Queue Dual Bus Metropolitan Area Networks.

30 Claims, 13 Drawing Sheets

U.S. PATENT DOCUMENTS

| | | | |
|---|---|---|---|
| 4,536,874 | 8/1985 | Stoffel et al. | 370/94.1 |
| 4,542,502 | 9/1985 | Levinson et al. | 370/88 |
| 4,566,097 | 1/1986 | Bederman | 370/89 |
| 4,604,755 | 8/1986 | Murray. | |
| 4,614,909 | 9/1986 | Järvfält. | |
| 4,689,760 | 8/1987 | Lee et al. . | |
| 4,771,391 | 9/1988 | Blasbalg | 370/94.1 |
| 4,782,523 | 11/1988 | Galand et al. . | |
| 4,815,071 | 3/1989 | Shimizu | 370/94.1 |
| 4,853,958 | 8/1989 | Rabipour . | |
| 4,953,157 | 8/1990 | Franklin et al. | 370/85.6 |

OTHER PUBLICATIONS

Engineering Dept., "EIA Standard, Telephone Instruments with Loop Signaling for Voice Band Applications", Electronic Industries Association, Issue 1, RS-470, Jan., 1981.

Engr. Dept., "EIA Standard, Private Branch Exchange (PBX) Switching Equip. for Voice-Band Applications", Electronic Industries Association, RS-464, Dec., 1979.

Hartung et al., "Dual-Tone Multifrequency Receiver Using the WE DSP32 Digital Signal Processor", American Telephone & Telegraph Application Note.

Oppenheim et al., Digital Signal Processing, Prentice-Hall, Inc., pp. 287-289 (1975).

Mock, "Add DTMF Generation and Decoding to DSP-uP Designs: Digital Signal Processing Applications with the TMS320 Family", vol. 1, Texas Instruments, pp. 545-557 (1989).

Microelectronics Analog Communications Handbook, Mitel Corporation, pp. 3-27 to 3-33 (1990).

Boston Technology Voice Processing Systems, "B. Technical Specification", ACCESS TM Series Technical Manual, pp. B-1 to B-18.

"DSC-2000 VoiceServer TM: The Fast Track to Digital Voice Processing" (Brochure from Digital Sound Corporation, Carpinteria, Calif.).

ACCESS PROTECTION AND PRIORITY CONTROL IN DISTRIBUTED QUEUEING

FIELD OF THE INVENTION

This invention relates to access protection and priority control in environments required to have distributed queuing access control. The processes to be described that embody the invention are applicable to a large number of environments. These environments have the common elements of high speed digital data transfer in packets along a digital data bus communications medium between a plurality of contending stations distributed linearly along that bus medium.

BACKGROUND OF THE INVENTION

The comprises invention alone and in combination the setting and control of data packet buffer thresholds as delimited in one or more counters within a station, and includes limits to the rate of request to send data packets and limits to the total number of packets issued by a station. In brief, counters and limits (thresholds) on counters, and queues and limits (thresholds) on queues, are used to control transmission (for example, transmission rate) processes on the bus communications medium.

Another environment in which this invention may be applied is the interaction between the Central Processing Unit (CPU) of a computer and the Peripheral Interface Adaptor (PIA) and/or any other component attached which are required to contend for access on to a high speed computer bus architecture utilising any length or speed digital data packet transfer communications medium.

The invention is also applicable to a wide variety of other digital data transfer environments allowing for partial or full implementation of the mechanism, since partial and full application of the mechanism provides different advantages, problem elimination and economies of operation for each of the applicable environments.

SUMMARY OF THE INVENTION

In order to describe the invention a preferred environment and physical application architecture will now be described, however, it will be understood by those skilled in this particular field and those in other related fields that the preferred embodiment is purely a means of one implementation of the invention.

This invention in its partial or full implementation is applicable in one embodiment to the proposed Institute of Electrical and Electronic Engineers (I.E.E.E.) Standard 802.6 Distributed Queue Dual Bus (DQDB) Metropolitan Area Network (MAN) Draft D.O. of Jun. 24, 1988 and, provides hitherto unknown advantages and advances to the implementation proposed therein.

I.E.E.E. 802.6 Draft Standard is a combined Medium Access Control (MAC) and Physical Layer application. These layers are respectively layers 2 and 1 of the Open Systems Interconnect (OSI) Seven Layer Reference Model.

It is important to appreciate that the invention is applicable to all seven layers of this Model apart from many other data transfer environments. I.E.E.E. 802.6 utilises a Dual Bus Queued Packet and Synchronous Switch (QPSX) which is a distributed switch/network that will fulfill the requirements of a public MAN. The Switch architecture of QPSX is based around two contra-directional buses, FIG. 1. These two buses involve a dual loop of transfer medium (nominally optical fibre but not necessarily so) arranged as a logical bus. One unit serving as master and the bus configuration thus eliminating the need to remove data from the medium as is done in ring configurations.

Writing to the bus is done only in "empty" slots/packets/cells so that an OR function suffices to combine the one bits '1' of the data with the totally all '0' slot packet on the bus. This simplifies the circuitry of each station which is in series with the bus traffic. The fact that the loop always has an opening provides a very important fault tolerance.

The use of dual buses and a plurality of contending input/output data sources called stations, also called nodes, has created the need for a distributed queuing protocol. A process called scheduling used, in this the prior art, which comprises the sending of reservations "up stream" when a station wants to transmit "down stream". Each station keeps an up/down counter running continuously, one for each transmission direction. When a slot reservation request goes by on the upstream bus, the counter is incremented by one. When an empty slot/packet/cell goes by downstream, the counter is decremented by one. A non-zero value in the counter means that there are unsatisfied requests for packets in the downstream direction, if it is zero, there are no outstanding requests.

When the station wants to transmit, it takes a sample of the up/down counter for the direction of transmission. If its contents are zero, it transmits in the next vacant slot. If the counter is non-zero, then the sample is counted down as empty packets go by in the downstream direction. These empty packets will satisfy the existing requests. On the next empty packet, the station is free to transmit.

The implementation of the I.E.E.E. standard aims to allow 10's or 100's of Dual Bus Distributed Queue MAN network stations to exist and intercommunicate to layers above and below it.

The operation of this scheduling is further dependent on two control bits within each packet.

The busy bit which indicates whether a slot on the network is used and the request bit R is set whenever a node or station has a packet waiting for access. Each station by counting the number of R bits it receives and non-busy packets, that pass it, can determine the number of packets queued (that is, in line) ahead of it. This counting establishes a single ordered queue across the network for access to each bus.

The control overhead of two bits per slot is effectively independent of network size and speed.

This prior art can be referenced in I.E.E.E. Communications Magazine Vol. 26, No. Apr. 4, 1988 pages 15–28 by Mollenauer and Newman, Budrikis, Hullett and Budrikis et al QPSX: a queue packet and synchronous circuit exchange. In Proc. I.CCC's 86, P. Kuhn, Editor, North Holland, Amsterdam, 1986.

This invention relates to an access protection and priority control mechanism (APPC mechanism) in distributed queuing. In its basic version the APPC mechanism ensures that the bandwidth allocated to each station contending for access to a common channel or transfer medium/bus architecture is kept in known limits independently of traffic load conditions. Moreover, under heavy loads, each station sees the common channel as a synchronous channel with fixed bandwidth.

Under no circumstances is the available bandwidth wasted.

In one embodiment, the APPC mechanism has been devised in order to deal with non-homogeneous load conditions, which prevail in the multi-service environment of the Integrated Services Digital Networks (ISDNs) within the ISO model.

The description ,of the APPC mechanism is organised around the following parts,
  Distributed queuing processes and their variations
  Unfairness of access in distributed queuing
  APPC mechanism—maximum and lower protection limits
  APPC mechanism—buffer thresholds
  APPC mechanism—other modifications
  APPC mechanism—static and dynamic management procedures.

BRIEF DESCRIPTION OF THE DRAWING

The objects, advantages and features of the invention will be more clearly understood from the following detailed description, when read in conjunction with the accompanying drawing, in which.

DETAILED DESCRIPTION OF THE PREFERRED EMBODIMENTS

Introduction

The operation of the proposed mechanism is based on the concept of access protection levels and input buffer thresholds. The access protection levels and buffer thresholds can be changed off-line or on-line to regulate an amount of bandwidth available to each station. The APPC mechanism can be implemented in the MAC layer or as a higher layer protocol by means of software or hardware. It can be applied in all stations or selectively. In that latter case it can be used only in several stations or applied to selected traffic types. The APPC mechanism can be used in a conjunction with different versions of the distributed queuing process.

The proportion of bandwidth guaranteed by APPC mechanism to each station does not depend on the channel bit rate or bus length.

Distributed Queuing Processes and Their Variations

Figure 1:
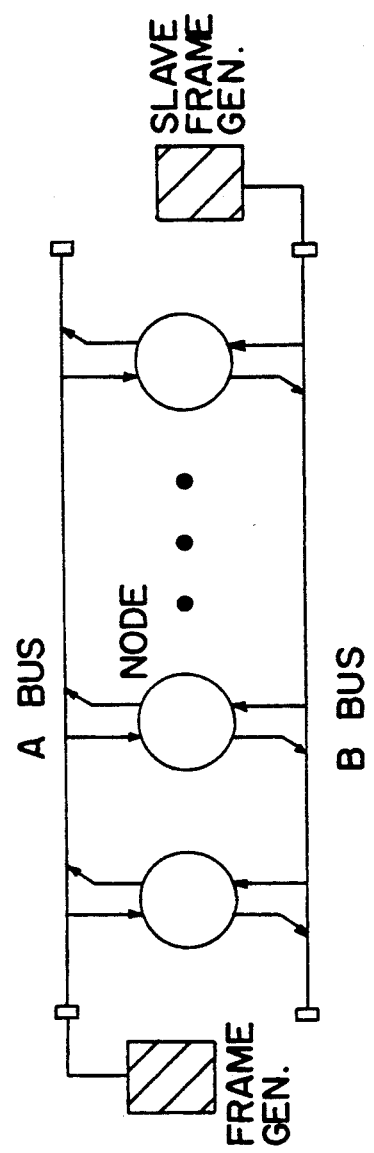
FIG. 1 shows the general switch architecture of QPSX.
Figure 2:
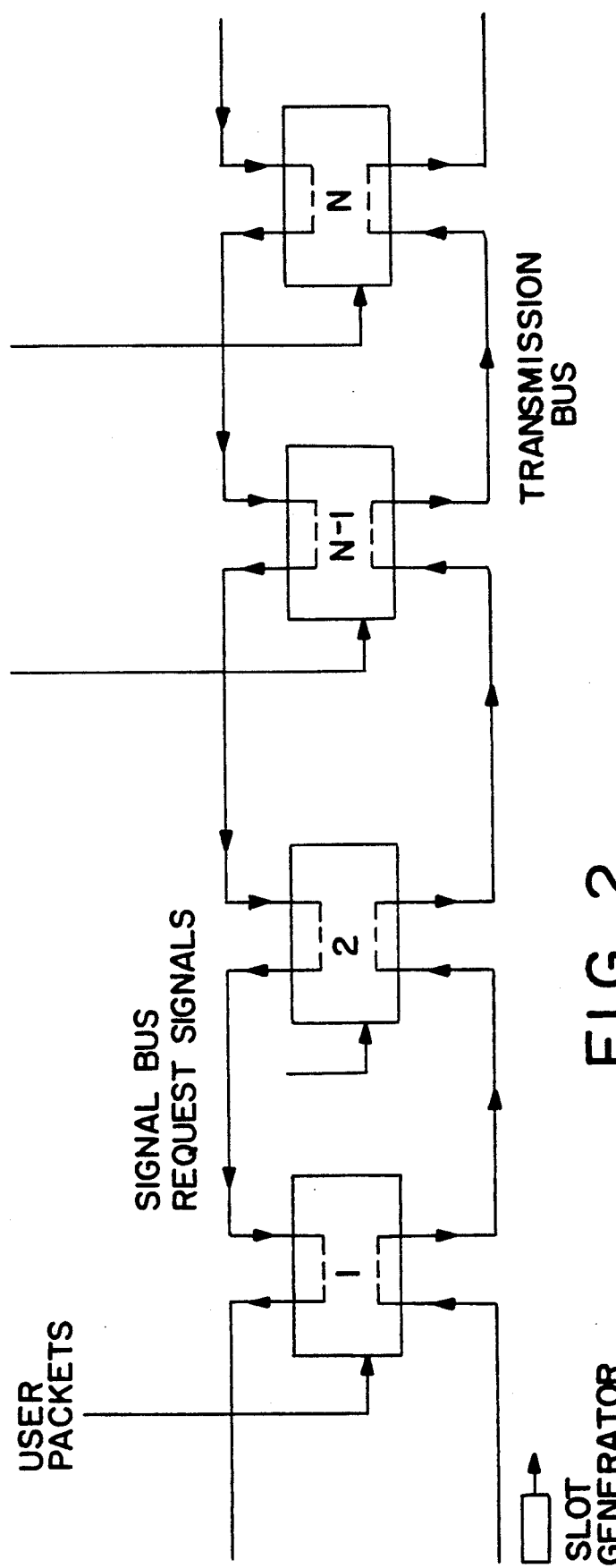
FIG. 2 shows the general architecture of distributed queuing process as proposed for access control in Dual Bus QPSX MAN.

A distributed queuing process has originally been proposed for access control in Dual Bus Distributed Queue MAN. Basically, it operates as follows, see FIG. 2. There are N stations which compete for access to the common channel. There are packets in the system that are generated by the user attached to the station which are to be transferred on the transmission bus, we will refer to them as 'user packets'. The channel time is slotted and the data transmission rate is a parameter of the system. In the recent CCITT nomenclature the time slots are called cells. The transmission is unidirectional. We assume that Station #1 receives each slot as the first one, and the Station #N as the last one. We shall say that the Station B or #2 in this example is downstream from A or #1 in this example if A receives slots before B. There is a second bus in the systems which serves to transmit packets in the opposite direction. Each of the Buses in a Dual Bus architecture is operated independently.

The control sub-channel which comprises a selected bit in each of the slots is separated from each transmission bus. It carries signals which control the traffic flow in the opposite direction by using the other bus, that is, the control signals are passed upstream with respect to the data flow on the other bus.

The control sub-channel is one bit in each cell, the so called R bit. When a given station receives a slot with the R bit set to '1'=one, it means that one of the stations downstream has a packet to send.

Each station maintains two counters:
  REQ (request) counter, and
  CD (count down) counter The REQ counter is increased by one each time the slot with R bit set to one is received from the downstream station via the signalling sub-channel. The REQ counter is decreased by one when: (a) the free cell is passed downstream, and (b) CD counter is equal to zero, and also (c) REQ is greater than zero. If CD is bigger than zero and the free slot passes the station and is passed downstream the CD counter is decreased by one. The CD counter is set equal to the value of REQ when a user packet arrives at the station.

Process 1

Assume that a packet not addressed to station S and generated by the user outside the bus arrives at the station S in the time slot K. Consider the following version of a prior art access algorithm which we will refer to as process 1.

1. If the Station S REQ=0 and the previously received packets from the outside user queue in S is empty the arriving packet attempts to seize the free slot on the transmission bus. We shall say that it starts hunting for the free slot on the transmission bus. At the same time, station S sets R=1 in the first cell, which is sent upstream on the signal bus and which has got the R bit set to zero.

2. If REQ>0 and the queue in S is empty station S transfers the current value of REQ to CD, and sets REQ=0 then sends R bit=1 upstream, and initiates the count down.

3. If there is a packet in the queue the new packet joins the queue and generates the R bit=1.

The R bit is generated by the station in the time slot in which the packet arrival occurs from the outside. If the R bit cannot be forwarded upstream because R bits in cells going upstream are already set to 1, it joins the queue of R bits which are waiting for sending upstream in the passing cells of the signal bus. We shall call the foregoing prior art version of the algorithm-process 1.

Process 2

A modification of the process 1 could be to take into account, when a packet does not issue the R bit upon its arrival to the non-empty queue. It would only do so after the packet comes to the head of the queue. We shall refer to such a mechanism as process 2. Process 2 is (currently implemented in hardware and software) proposed as the IEEE 802.6.

In brief, according to the above descriptions the Station is operated according to the following steps;
packet arrives and R bit is switched on
count down is initiated
count down is accomplished
free cell is hunted for
packet is transmitted
queue is checked.

If the queue is not empty after the transmission of the previous packet then 1) the station starts hunting if REQ=0, and 2) if REQ=/=0 it initiates the process of counting down to zero. Additionally in process 2 it generates the next R bit.

We have thus far assumed that the requests in a given station form the queue. In other implementations of the above process the request signal, being generated when R in a passing cell is already set to 1, may overwrite R or may be neglected.

A still further implementation dependent feature is the requirement for a permission to transmit the user packet. In some implementations a given station can transmit a packet only after it was able to write a request bit. We assume, however, that in the case of process 1 this is not necessary.

We stress that in this description we are concentrating on a particular version of the I.E.E.E. distributed queuing algorithm only to illustrate the prior art and introduce the problems and limitations of that prior art generally.

The invention to be described comprises alone or in combination access, protection limits and input buffer thresholds associated with a plurality of counters at each station preferably the REQ and CD counters, said process being capable of use in conjunction with any version of a distributed queuing process and this to be compared with the following prior art.

In the prior art, at Station S, starting the count down, means that each time a free slot passes the station the content of the CD counter is decreased by one. Station S can then start hunting for a free cell on the transmission bus in which it could put the waiting user packet, after the CD value drops to zero. That is, if, say, at the beginning of the free time slot k+m, m≧0, the CD is zero, the slot k+m can be used by the packet in S.

Unfairness of Access in Distributed Queuing (Blocking & Choking)

There are many types of unfairness in the considered prior art systems. We shall first consider the unfairness which occurs when the process 1 is applied.

Blocking of Upstream Stations (Stubborn and Transient Unfairness)

Process 1 works well as long as the network is not congested. Trouble occurs when there are very many stations which want to send packets simultaneously. Then the unfairness period starts and exists as long as the system is heavily loaded. It may result in complete blocking of upstream stations. The unfairness, which occurs under heavy loads will be called 'stubborn unfairness'.

Under a slight load, it is possible for one of the stations to temporarily intercept all the available bandwidth of the medium. This second type of unfairness will be called transient unfairness, Transient unfairness is not disastrous for system operation for it lasts only for the period of time equal to the round-trip delay between stations situated at opposite ends of the bus.

Unfairness Under Light Loads (Transient Unfairness)

It must be remembered that the stations can be situated far apart one from another. Thus delays are caused in forwarding cells and control signals. To illustrate this consider this simple example. Assume that
1. The channel bit rate is 150 Mbit/s=c.
2. The distance between stations A and B is 10 km.
3. The signal propagation speed is 200,000 km/s
4. The slot size is 32 bytes.

Then, 30 slots are issued from the upstream station A before the control signal from the station B reaches A. The one way signal delay is 50 us. If station A is very active and seizes all the slots the station B will receive the first free cell after 100 us. We call this unfairness transient unfairness because only after the initial period of (100 us) or 60 time slots, does the station B receive free cells systematically again.

Unfairness Under Heavy Loads (stubborn unfairness)

To explain how the effect of the stubborn unfairness manifests itself we must make additional assumptions about the distributed queuing protocol.

Firstly, we must specify what happens when the next user packet arrives at the station before the previous user packet has been transmitted. Two operation modes are possible.

MODE 1. The next packet waits till the transmission of the previous packet has been completed. Assume that the transmission of the first packet has been completed in the time slot k. Then, the content of the REQ counter is transferred to the CD counter during the slot k. That is, at the beginning of the slot k+1 we have REQ=CD, and the count down process starts again.

This mechanism is called a 'non-exhaustive mechanism'.

MODE 2. The next packet starts hunting for the next free cell just after the previous transmission has been accomplished.

Figure 3:
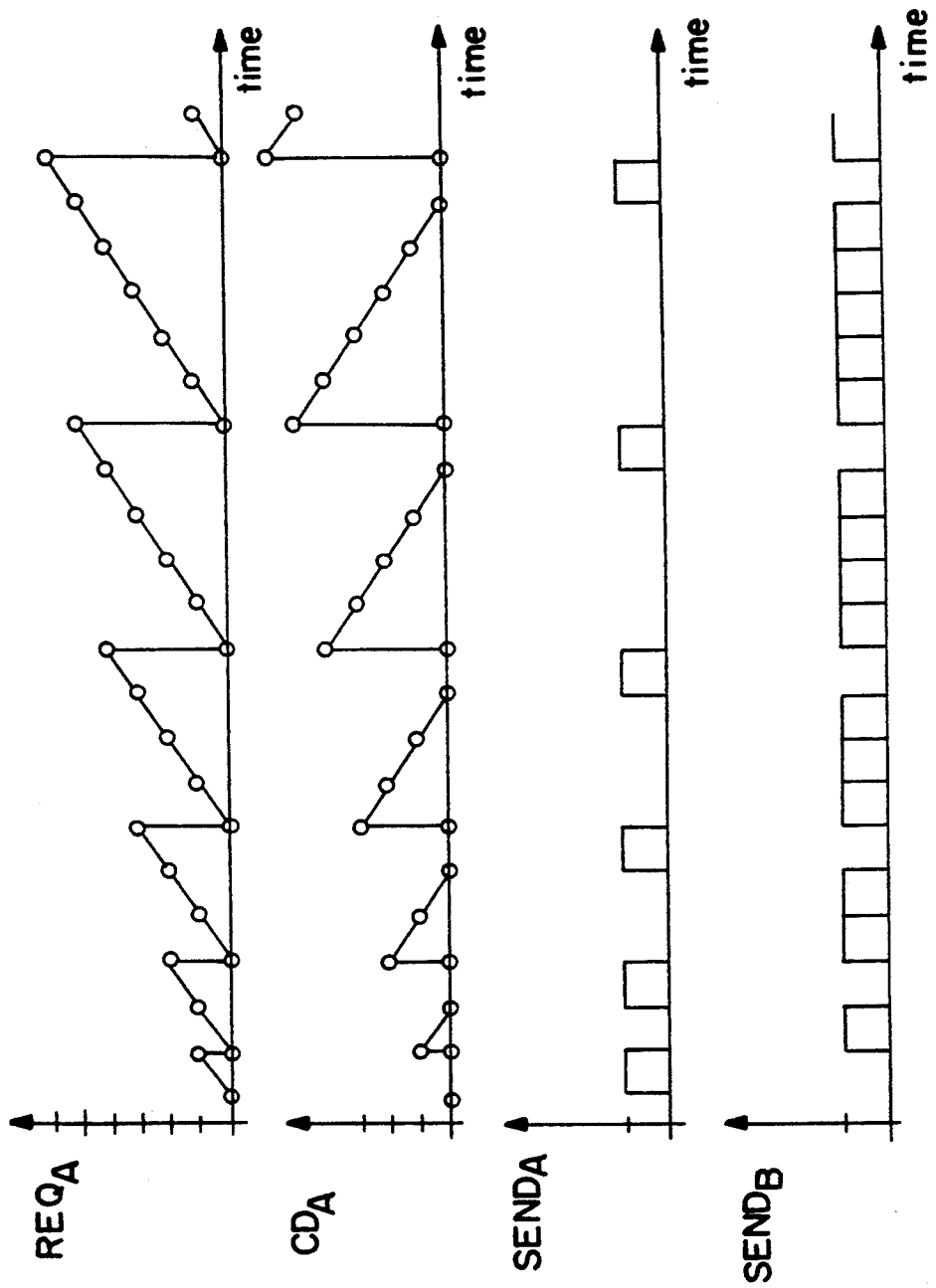
FIG. 3 shows a depiction of the unfairness which occurs in the case of the non-exhaustive mechanism during heavy load conditions.

This mechanism is called an 'exhaustive mechanism'. The exhaustive mechanism leads in an obvious way to seizing of the bandwidth by the upstream stations. The unfairness, which occurs in the case of the non-exhaustive mechanism, is illustrated in FIG. 3.

Two stations are considered. Station A is situated upstream with respect to the Station B. We assume heavy load conditions. That is, packets arrive both to A and B in each time slot. It follows from the figure, that station A must give priority to station B. This is due to the fact that the R bits arrive at A in each time slot. Thus, the sum REQ+CD increases by one in each time slot. Each time the packet from A is transmitted the maximal value of REQ+CD is increased by one. Thus, the length of the time period between transmissions from A increases thus exhibiting a stubborn unfairness.

Choking of Downstream Stations

When process 2 is applied it may occur that the downstream stations are blocked. This happens when the station upstream is very active. Assume that the station being downstream then issues a request. It takes 60 time slots in our previous example before the station downstream receives a free slot and only then can it generate a second request. Thus, the downstream station will receive only 1/60 of the bandwidth.

It follows that the lower limit on the performance of stations placed at the end of the bus cannot be controlled. The proportion of bandwidth available to the last station decreases when the channel bit rate or bus length increases. This is a significant drawback of process 2 when implemented in MAN networks which are characterised by long distances and high bit rates.

APPC Mechanism—Upper and Lower Protection Limits

In order to counteract the unfairness which occurs in the distributed queuing process and have a mechanism which controls an amount of bandwidth allocated to each station our invention has the following characteristics, Access protection limits are applied; and a threshold is imposed on the number of user packets generating request bits.

The process which has the above attributes will be called APPC (Access protection and Priority Control).

In order to illustrate how APPC works we consider process 1. We again stress, however, that the proposed mechanisms can be also implemented in the case of process 2. The set up of protection limits and buffer thresholds will then be different depending additionally on the particular mode of writing request bits.

The upper protection limit in the nth station will be denoted $P_{max}(n)$, and the lower one $P_{min}(n)$. The protection limits are applied when the content of the REQ counter is transferred to the CD counter;

REQ→CD. Under the upper protection mechanism:

$$CD = min\{REQ; P_{max}\} \text{ and } REQ = 0$$

or; a still further mode of the APPC mechanism is to set the value of REQ counter to $REQ = REQ - P_{max}$ after its contents is transferred to CD.

This further mode can be used to further regulate bandwidth sharing between the stations.

Correspondingly, if the lower protection limit is applied then $$CD = max\{REQ; P_{min}\}$$

As a consequence the upper protection mechanism eliminates the stubborn unfairness if the protection levels are well chosen.

The lower protection mechanism relieves the transient unfairness but at the expense of bandwidth wastage. Both mechanisms can be used to control, an amount of bandwidth allocated to each station.

Upper Protection Limit

Figure 4:
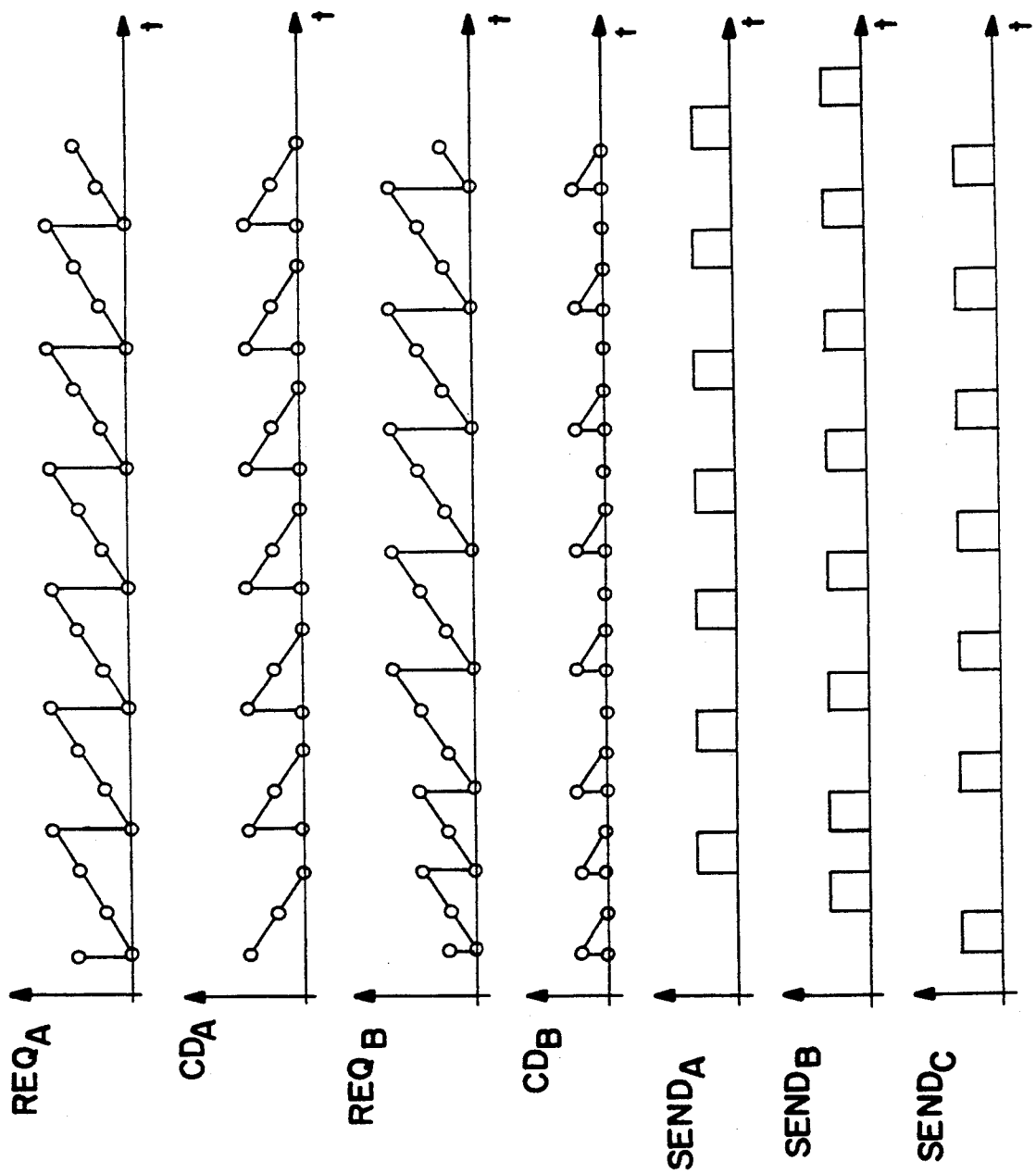
FIG. 4 shows a depiction of the operation of the APPC upper protection limit during heavy load conditions.

We can illustrate the operation of APPC upper protection limit by considering three stations: A, B and C, where B is downstream from A, and C is downstream from B. Assume that all stations are experiencing heavy load conditions. The time behaviour of the network is illustrated in FIG. 4, where he lower protection limits are set to zero, and the upper protection limits are:

$$P_{Amax} = 2, P_{Bmax} = 1, \text{ and } P_{Cmax} = 0.$$

Clearly, each station gets one third of the bandwidth, and each channel is synchronous. In general, under heavy load, station S with access protection limit $P_{Smax} = m$ gets at least $1/m + 1$ of the bandwidth, which was not used by the upper stations.

If there are N stations numbered from 1 to N, the station being the uppermost, then we secure for each station N at least 1/N of the bandwidth just by setting $P_{nmax} = N - n$. Note that each station then gets at least 1/N share of bandwidth independently of channel bit rate and bus length.

Obviously, the upper protection limits could be set in a number of different ways. Changing the upper protection limits we can secure a required bandwidth for each station, independently of the load on the network. An attractive concept is to set limits for clusters of stations, or alternatively, implement different levels of intracluster or intercluster limits.

Assume that there are several traffic classes in the network, and each class generates a different type of request signal, e.g., sets a different request bit in slots going upstream, then, if there are several REQ counters in each station, one for each class of requests. The separate access protection limits can be set for each traffic class in each station.

Lower Protection Limit

The lower protection limit prohibits a use by the station of bandwidth, which is bigger than the assumed limit. The station must always allow to pass at least $P_{min}$ free slots before it can transmit a Packet. Thus, if $P_{min} = m$ the station receives at most $1/(m+1)$ of bandwidth which was not used upstream.

The lower protection limit can be used if a given station expects packet arrivals downstream. Then the stations downstream receive free slots with a delay smaller than the round-trip delay.

The lower protection limits can be also applied to not allow the station to use more network resources than it is authorised to use.

APPC Mechanism—Buffer Thresholds

The lower and upper access protection limits do not completely eliminate all negative effects which may occur under very high and non-symmetrical loads. To deal with such situations additional means can be used. They comprise:

buffer thresholds request rate limit

BUSY counter bounds

Buffer Thresholds

Perhaps the most simple to implement and most effective mechanism is the 'buffer threshold limit'. Using this mechanism the number of packets waiting in a queue in each station is limited. Alternatively, the packet can always wait in a buffer, but it can generate a request only if the number of its place in the queue becomes smaller than the threshold $Q_{max}$.

A particularly attractive mechanism is invoked when the buffer threshold mechanism is used in a conjunction with the access protection limits.

In order to illustrate how the buffer threshold mechanism works consider an example of two stations A and B. Assume that $P_{Amax}=n+m$ and $P_{Bmax}=n$, and that station B is downstream from A. The stations are situated close to one another so that the propagation delay can be neglected. Assume further that only those two stations are active in the network, and that each one of them generates a traffic load which is bigger than the channel bit rate.

The analysis of the system operation indicates that if the buffer threshold mechanism is not applied, then after some time the station A will receive the $1/n+m+1$ proportion of the bandwidth and the station B the rest of it. In particular, if A is close to the beginning of the bus and has a high protection number, then it will get only a small proportion of bandwidth as compared to B.

Figure 5:
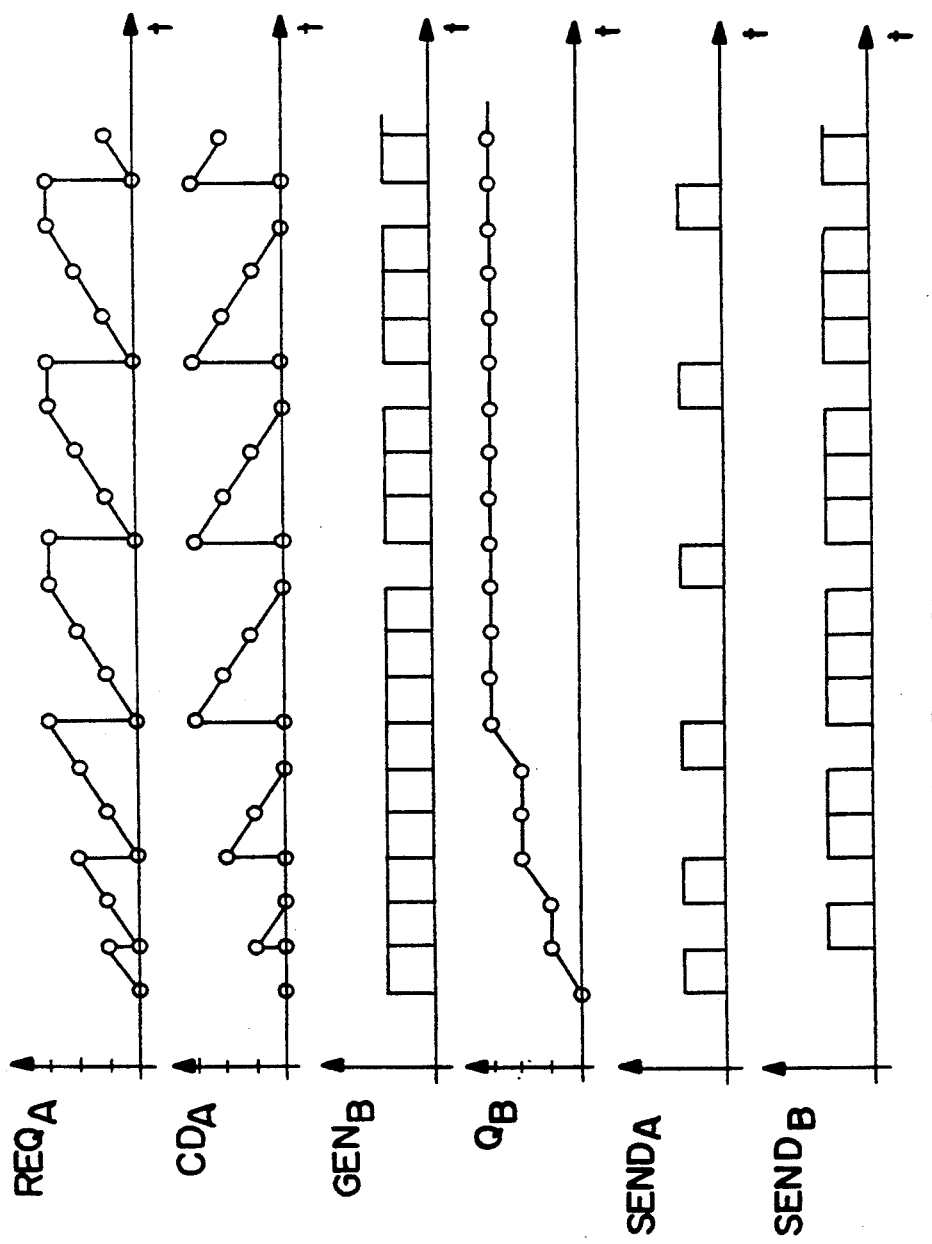
FIG. 5 shows a depiction of the operation of the bandwidth availability of the system of particular stations.
Figure 6:
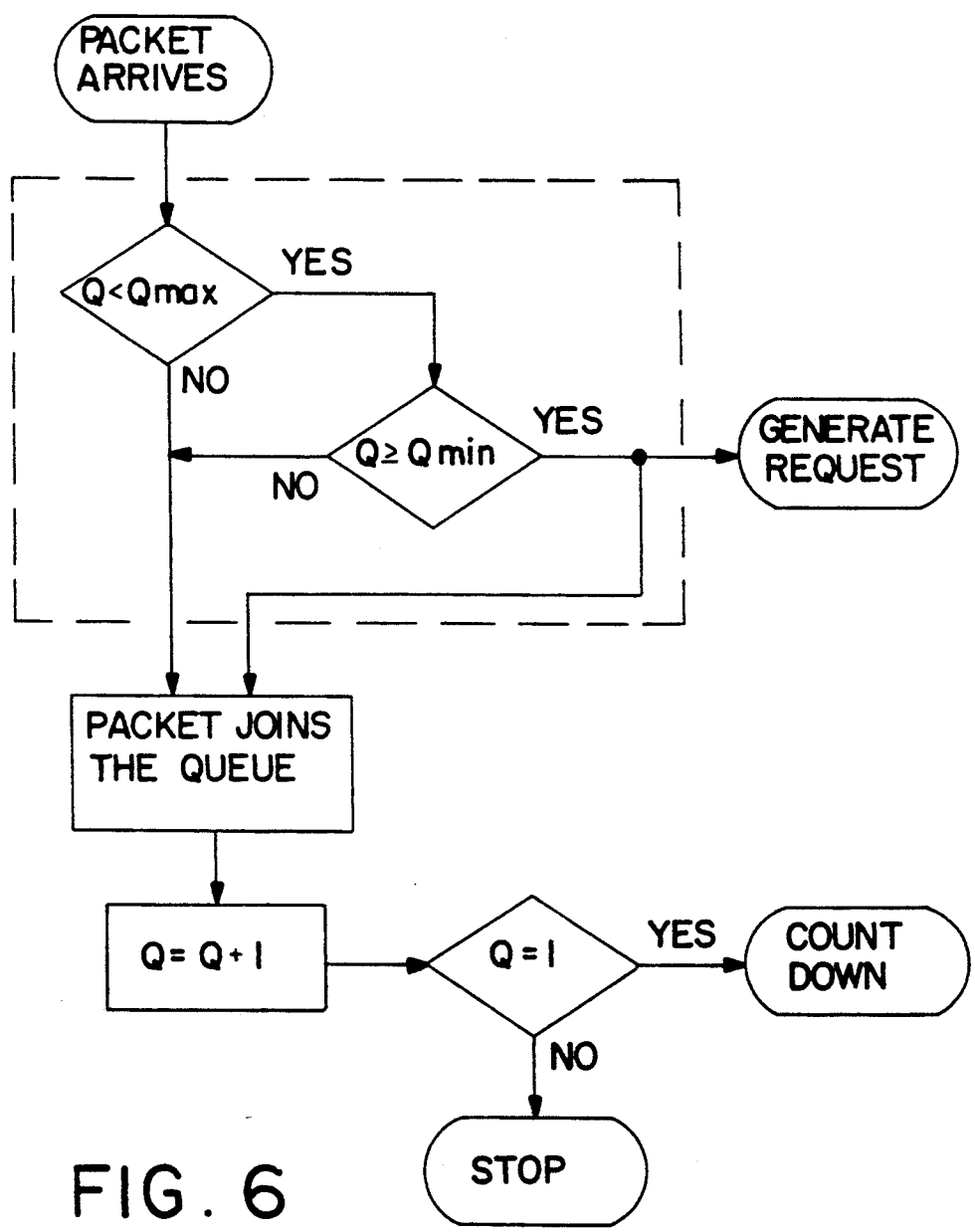
FIG. 6 shows operation of lower and upper input buffer threshold limits.
Figure 7:
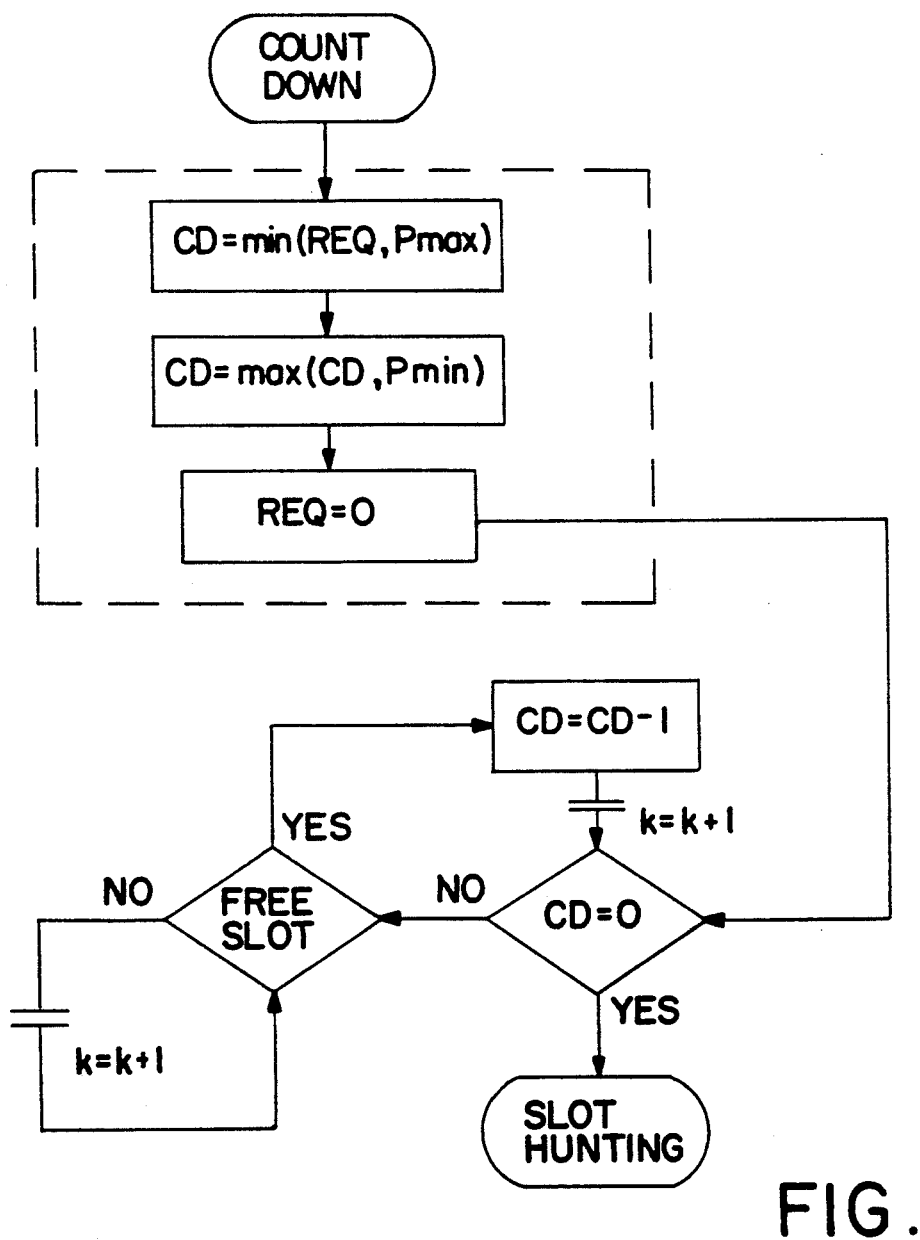
FIG. 7 shows operation of lower and upper protection limits and the countdown process.
Figure 8:
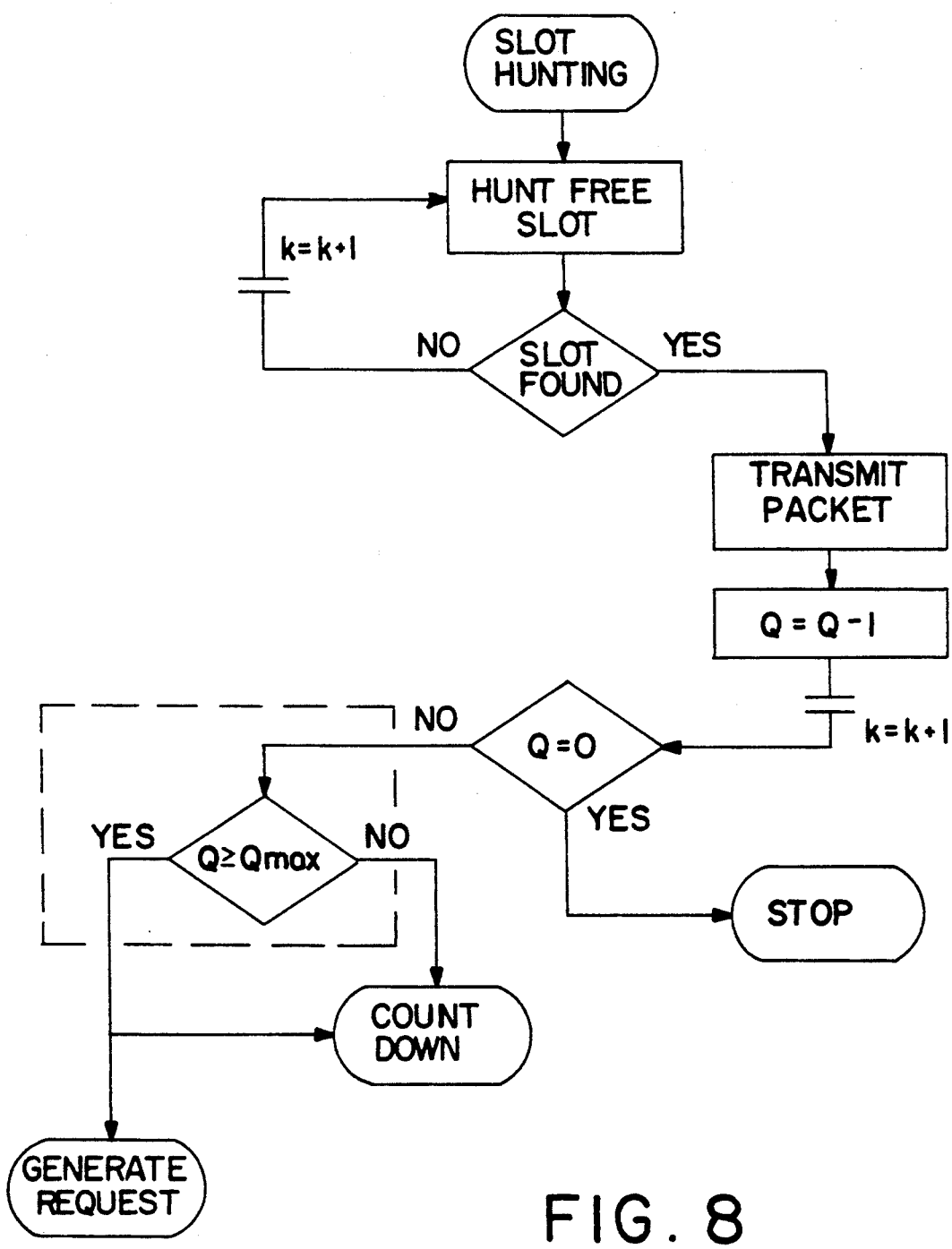
FIG. 8 shows the issuing of a user data packet on the first transmission medium and checking of queue of waiting user data packets.
Figure 9:
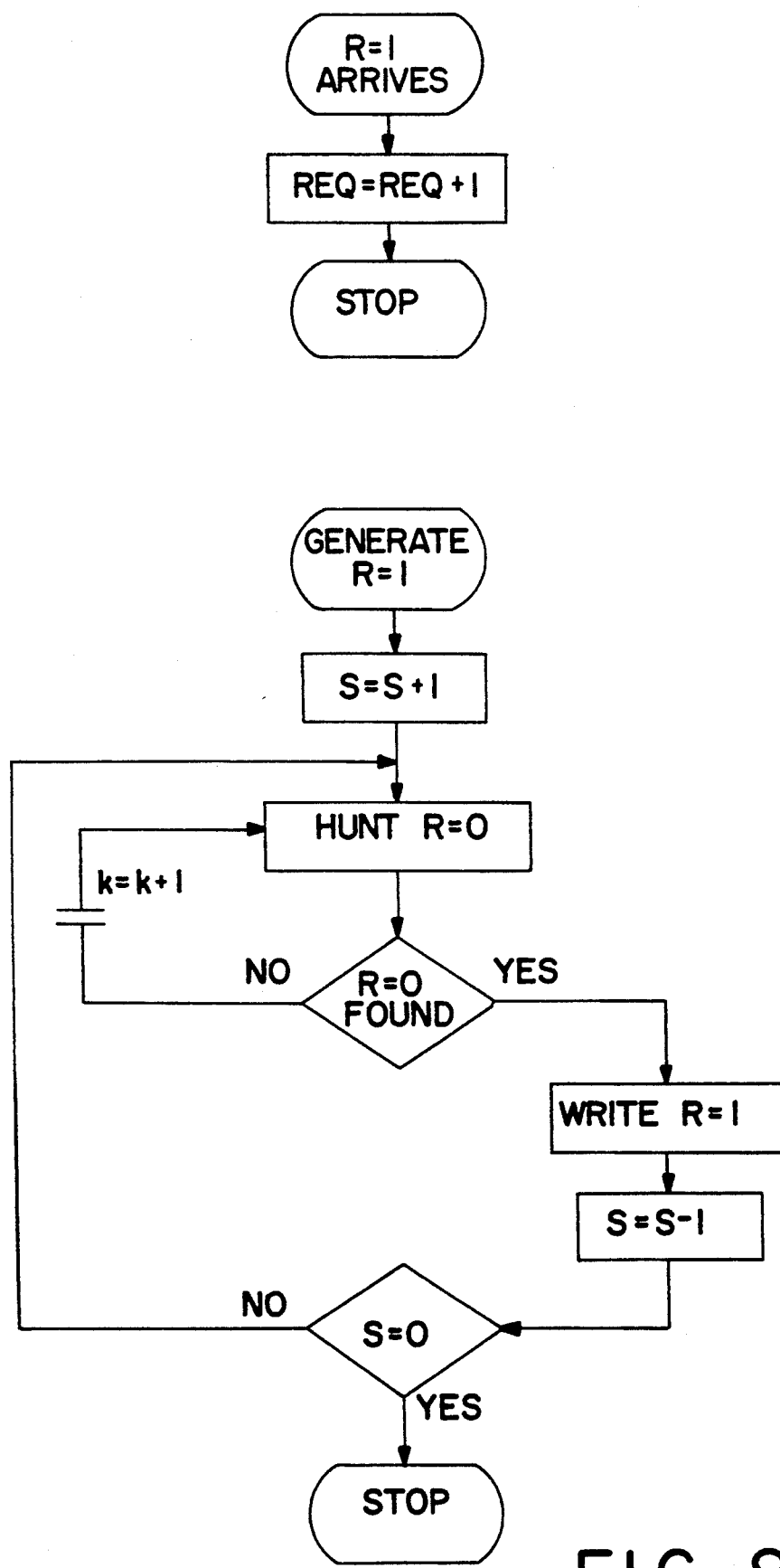
FIG. 9 shows the process of request bit generation and issuing of that bit on the second communication medium.
Figure 10:
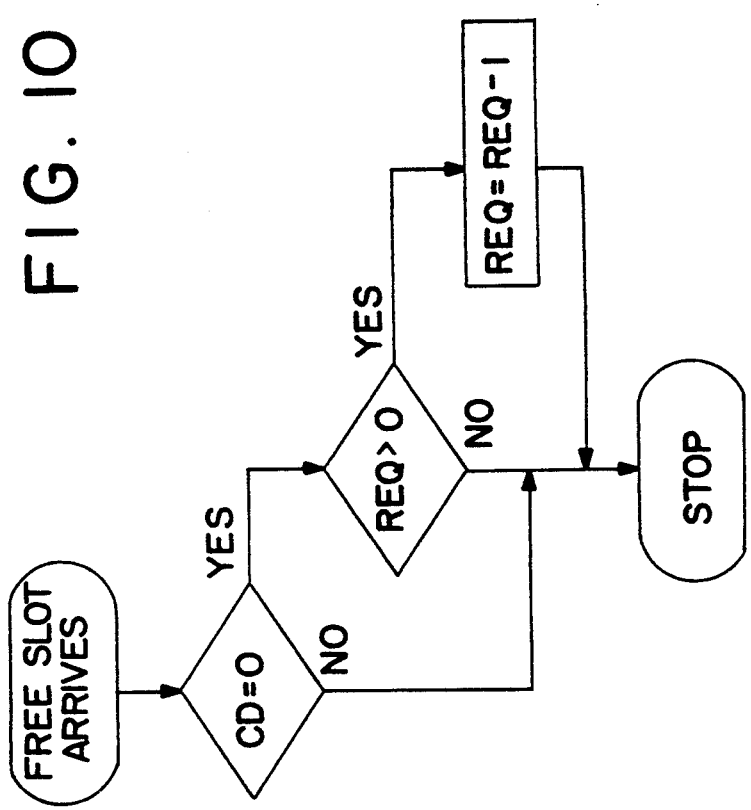
FIG. 10 shows the process of decrement of request counter upon the arrival of a free slot.

Assume now that the buffer threshold in station B has been applied and that the user packets arriving when $Q \geq Q_{max}$ are discarded or wait in the external queue. FIG. 5 shows what happens when this threshold is equal to 3, $Q_{max}=3$. Clearly, station A receives ¼ of the bandwidth. We have assumed that the new packet can be forwarded to the buffer in the time slot in which another packet is taken from the buffer. It can be easily checked that the mechanism also works if in a given time slot only an IN or OUT operation is permitted.

The choice of the buffer threshold for a particular station provides an additional mechanism of access control and has the additional desirable feature that if in all stations $Q_{max}=\infty$ we get Process 1, while setting $Q_{max}=1$ corresponds to operating the system according to Process 2.

The buffer threshold should be related to the position of the station on the bus and to the propagation delay. In the system without priorities the downstream stations, far away from the beginning of the bus in terms of signal propagation time, should have bigger threshold values than the upstream stations. We suggest that for the last station on the bus the buffer threshold should be at least equal to ¼W, where W is a round-trip delay, measured in time slots, between the first and last station.

Treating the above threshold as the upper threshold the lower threshold can also be considered, when a station can generate a request only if the packet queue has a length bigger than some pre-set value. This could be the case of lower priority stations.

1. A station using APPC observes three external events
   1. User's data packet arrival;
   2. Arrival of the free slot on the first communication medium (transmission bus);
   3. Request arrival on the second communication medium (signal bus) (Rbit=1)

Processes triggered by those events are shown in FIGS. 6 to 10, where the following notation has been used;

k=time slot k
CD=countdown counter
REQ=request counter
Q=no of packets waiting for transmission
S=request queue size
$Q_{max}$=upper input buffer threshold
$Q_{min}$=lower input buffer threshold
$P_{max}$=upper protection limit
$P_{min}$=lower protection limit
R=request bit In this embodiment it is assumed that the request bits which cannot be written on the second communication medium (signal control bus) since R bits arriving from the downstream are already set to 1 and thus R bits form the queue. S denotes the value of that queue.

k=k+1 denotes that the operation is repeated in the next time slot.

APPC Mechanism—Other Modifications

We have mentioned that other mechanisms can be appended to the proposed process.

Request Rate Limit

The rate of request generation can be controlled by counting the number of requests issued by a given station. If the counter content exceeds the limiting value $L_1max$ the station must allow to pass upstream $L_2max$ slots with R bit set to zero. Then the station can again issue the request bits. The counting process starts from zero or some positive value. Using this mechanism we can effectively decrease the risk of flooding the network with requests generated by one station. The request rate limit mechanism can be applied when the request bits are not allowed to form a queue. That is, when overwriting of R=1 on R=1 is permitted or, alternatively, when R=1 bits generated during the time slot on the control bus, when R bits already set to 1, are dropped.

The effect of the request rate limit mechanism is very similar to the input buffer threshold mechanism in that it limits the number of requests going upstream.

Busy Counter Bounds

Each time the station puts the packet into the empty cell it sets the BUSY bit in this cell to one. The BUSY counter can be easily appended to each station counting how many packets were issued from that given station. Having the upper bound on BUSY counter, $B_1max$, we can decrease an amount of traffic forward from that station to the bus which is less than $B_1max$. If the number of issued packet is greater than $B_1max$ the station must allow $B_2max$ empty slots to pass down and only then can it restart its own transmission.

Figure 11:
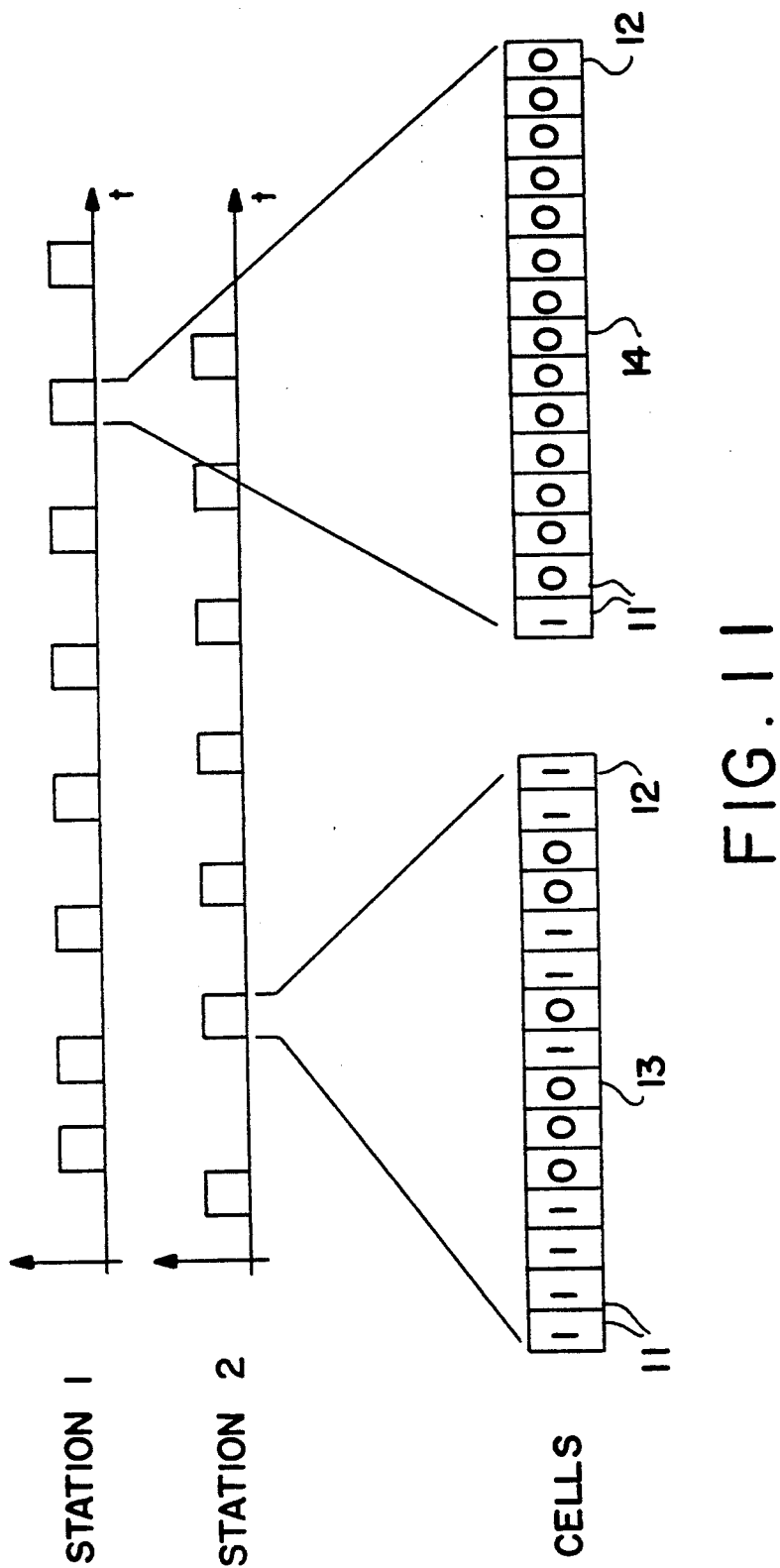
FIG. 11 shows cells on the first packet data communication medium and the configuration of information bits therein.

FIG. 11 shows an example of the contents of two cells that have been issued from the two types of stations 1 and 2. Station has a cell identified by its Least Significant Bit (LSB) denoted 11 and having digital value '01'. Station 2 has a cell identified by its LSB's also denoted 11 and having digital value '11'. Thus although these cells are communicated along the same first communications medium they will only be associated, read and issued by their respective stations.

The Most Significant Bit denoted 12 in each cell denotes whether the cell is free value '0' or occupied value '1'. Thus the bits denoted 14 are all '0' indicating further that the cell is free and t bits 13 are a variety of values indicating the contents of a user data stream.

Figure 12:
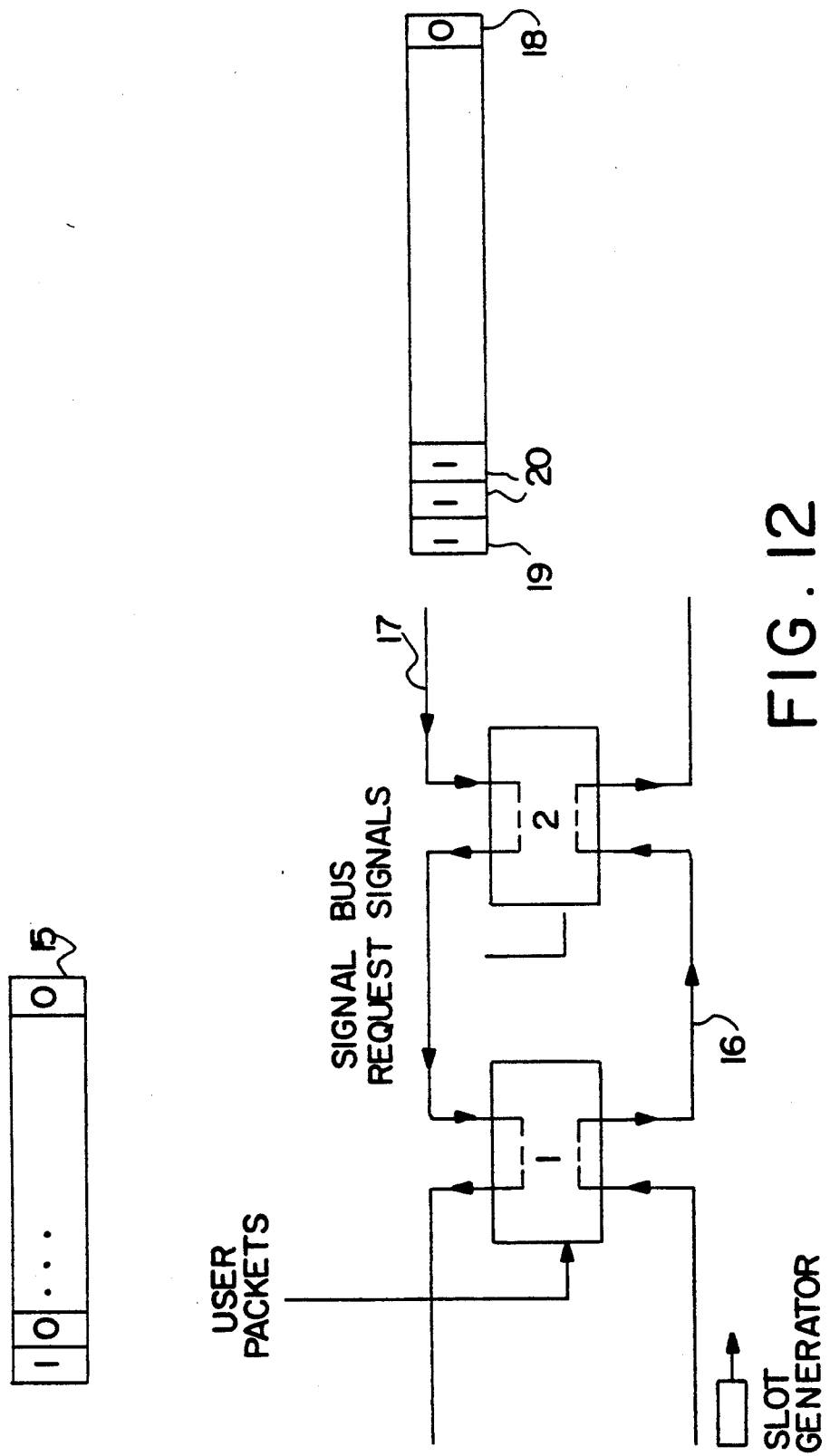
FIG. 12 shows stations and examples of data request bits, types of request bit type identification and a user's data packet.

FIG. 12 shows a user data packet 15 having various bits within the packet which is placed into, the station 1 as the user requires. The APPC mechanism will then control the issuing of that packet onto a free cell on the first communication medium 16 in concert with data information received by station 1 on the second communication medium 17. Cells, packets or indeed analogue signal data, however, shown in this figure as a cell, 18, with various bits denoted as data request bit 19 set '1' to indicate a downstream station is requesting a free slot, and bits 20 which separately identify the cell as being a particular type of request bit cell. Additional capacity in the cell may be used as previously discussed.

Figure 13:
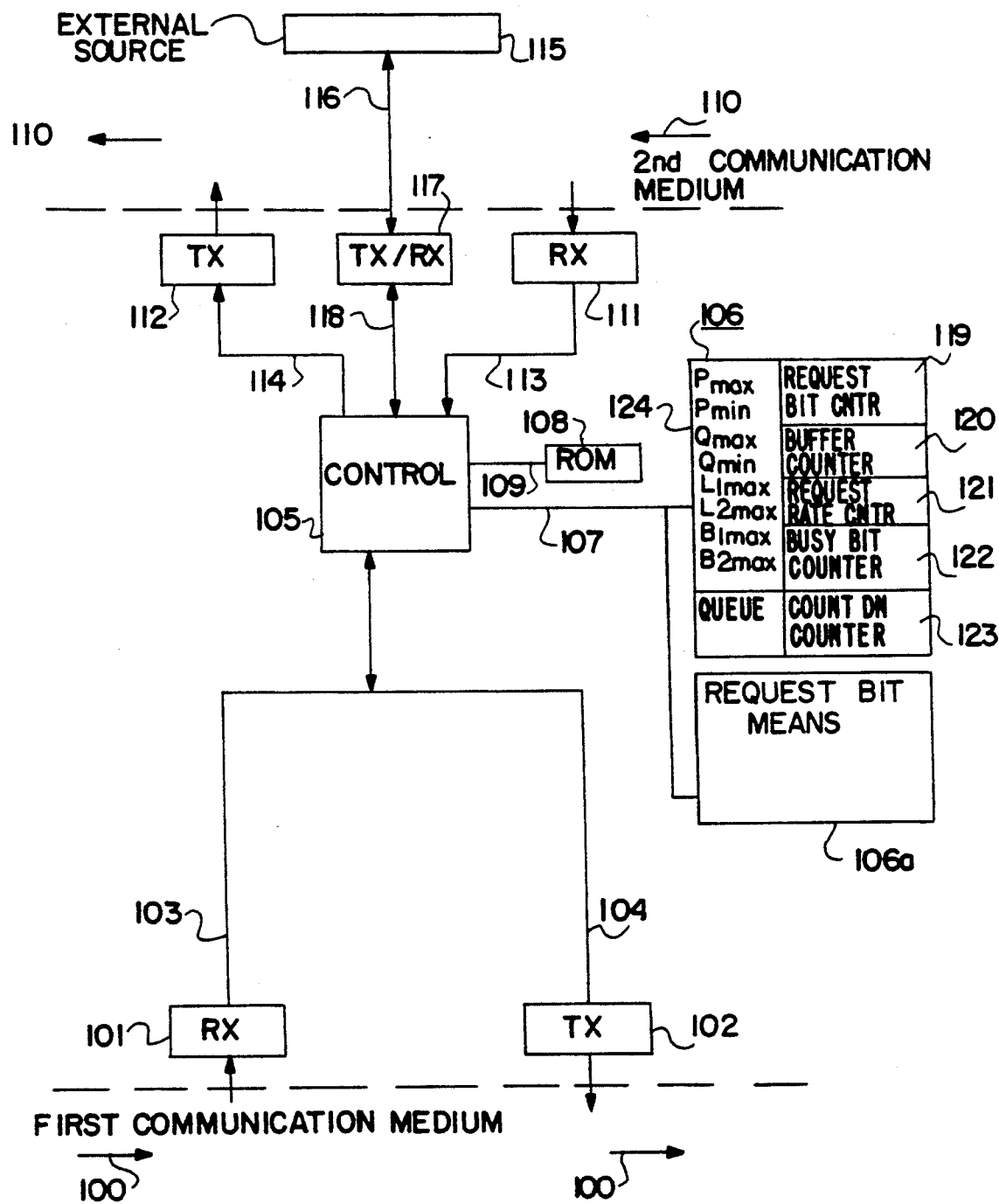
FIG. 13 shows a station and an embodiment of its configuration.

FIG. 13 shows one embodiment of a station capable of employing full or partial implementation of the APPC mechanism. A first communication medium 100 providing data communications downstream receives slots on the medium with receiver 101 (this device is well known in the art) and connected via 103 to the control means 105.

A variety of upper and lower limits variously denoted $P_{max}$, $P_{min}$, $Q_{max}$, $Q_{min}$, $L_{1max}$, $L_{2max}$, $B_{1max}$ and $B_{2max}$ are stored within Memory means 106 and more particularly in area 124. Connection means 107 provides a communication path for data exchange with the control means 105. Additionally a variety of counters are resident in memory means area 106 or alternatively could occupy separate housings and accumulated values equally available to the control, means 105. These counters are denoted Request Bit Counter 119, Buffer counter 120, Request Rate counter 121, Busy Bit Counter 122 and Count Down counter 123. A second communications medium 110 transmitting information upstream is used to communicate information relating to the requests for free cells from stations downstream. Receiver 111 connected via means 113 to the control means 105 receives all the data, while control means 105 discriminates which data is relevant to the station or not.

Transmitter 112 via connection means 114 continues the second communication path of information, by transmitting the received information and if required by the request bit means 106a via connection means 107 upon control of the control means 105 issues a request bit indicating the stations need to issue a users data packet onto the first communications medium 100. External source 115 feeds and receives data into and out of the station via communication means 116 and via a transmitter/receiver 117 via additional communication means 118 into the control means 105.

The external source may be a higher layer of the ISO model or single user personal computer or other devices capable of receiving and transmitting digital data.

The various connection means described may comprise hard wires, circuit board tracks or connections in integrated circuit chips.

The control means is preferably a microcomputer device programmed to perform the required control function, said program being resident in ROM 108 and connected via 109 to the control means 105.

Bidirectional Control of the Bus

The four mechanisms presented so far: (1) access protection limits; (2) input buffer thresholds; (3) request rate limits; and (4) busy counter bounds allow for the 'bidirectional control' of the transmission bus.

There are two mechanisms: access protection limits and busy counter bounds which say how many slots going downstream a given station can seize and which exemplify the use of thresholds on counters and queues to control packets from a given station on a transmission bus. And there are also two mechanisms: input thresholds and request rate limits which say how many requests a given station can issue upstream and exemplify the use of thresholds on counters and queues to control the transmission of request bits from a given station on a signalling bus.

It will be apparent to the skilled practitioner that the protection and control mechanisms described hereinbefore are equally applicable to single bus environments which have a control path running upstream of the bus. As equally applicable is the utilization of this mechanism to internal communications environments of chips and any form of digital traffic control means, for example, trunked telephone/radio or telecommunications voice switching systems which may, of course, comprise analogue or digital voice circuits.

The use of various counters and limits at each station along a communication medium and as heretofore described is shown specifically as applicable to one half of a dual bus system, the other half of the dual bus having exactly the same configurations and limits so as not to unbalance the dual buses although variations of the invention may operate only one bus and its corresponding control channel/s or partial implementations thereof.

It will also be clear that the second communication medium may comprise dedicated analogue connection means which carry data in any convenient form to represent the request bit information, or alternatively the second communication medium may comprise a specific bit with a packet switched communication medium just like the first communications medium wherein a bit or bits is used to represent the request bit information intended to communicate the request to upstream station of the need of a downstream station to insert a user data packet onto and into a free cell on the first communication medium.

APPC Mechanism—Static and Dynamic Management Procedures

The APPC mechanism relating to this embodiment can be operated as a static preset procedure, operating in the MAC or one of the higher layers. In the static mode the APPC parameters are changed by the network manager from the keyboard. It seems, however, that system efficiency could possibly be further increased by adaptive adjustment, by the system itself, of limits, bounds, and thresholds to changing load conditions.

Note that the quality of system operation generally depends on the amount and quality of information about the state of the system that is available to the controlling person or device, and secondly, that the nature of communication traffic is such that it is not necessary to update the system control parameters on the same time scale within which packets are sent.

Therefore, in order to dynamically adjust the control parameters additional 'control' stations could be added to the network. In large networks they will be needed anyway to perform management, maintenance and testing functions. One such station could serve a cluster of user stations. Alternatively, user stations can serve as control stations, running control protocols in higher layers of network architecture. Traffic management would consist of measuring channel utilisation (e.g., in pre-defined windows), collecting information from other stations about load, and re-calculating the flow control thresholds.

In networks supporting virtual connections the control parameters could also be changed each time one of the stations issues a higher layer request for a connection set up.

We stress that such dynamic management can be built on top of the static APPC mechanism, as a separate and independent function.

What is claimed is:

1. A method of controlling the bandwidth of a communication medium useable by a station in a packet switching network having a plurality of stations coupled between first and second contra-directional communication mediums wherein the $n^{th}$ station comprises:
   a request bit counter responsive to request bits received in packets on the second communication medium from stations upstream of said $n^{th}$ station;
   a countdown counter responsive to free and occupied packets received on the first communication medium from stations downstream of said $n^{th}$ station; and
   a memory means to store a plurality of values, one of which is representative of an upper protection limit (Pmax(n)); wherein
   when said request bit counter value is non-zero and a packet not addressed to said $n^{th}$ station is received by said $n^{th}$ station from outside said network, said method comprises the step of setting said countdown counter value equal to the lower of either said request bit counter value or Pmax(n) to control the bandwidth of the first communication medium useable by said $n^{th}$ station.

2. The method of claim 1, and comprising the further step of setting said request bit counter of said $n^{th}$ station equal to the value of said request bit counter minus the value of Pmax(n).

3. A method of controlling the bandwidth of a communication medium useable by a station in a packet switching network having a plurality of stations coupled between first and second contra-directional communication mediums wherein the $n^{th}$ station comprises:
   a request bit counter responsive to request bits received in packets on the second communication medium from stations upstream of said $n^{th}$ station;
   a countdown counter responsive to free and occupied packets received on the first communication medium from stations downstream of said $n^{th}$ station; and
   a memory means to store a plurality of values, one of which is representative of one lower protection limit (Pmin(n)); wherein
   when said request bit counter value is non-zero and a packet not addressed to said $n^{th}$ station is received by said $n^{th}$ station from outside said network, said method comprises the step of setting said countdown counter value equal to the upper of either said request bit counter value or Pmin(n) to control the bandwidth of the second communication medium useable by said $n^{th}$ station.

4. The method of either claim 1 or 3, wherein at least two types of stations are adapted to receive packets only from like stations.

5. The method of either claim 1 or 3, wherein there are at least two types of packet and respective request bits and respective free and occupied packets of said types.

6. A method of controlling the bandwidth of a communication medium useable by a station in a packet switching network having a plurality of stations coupled between first and second contra-directional communication mediums wherein the $n^{th}$ stations comprises:
   a queue means to store user packets not addressed to said $n^{th}$ station and issue said user packets on a first in first out basis which have been received by said $n^{th}$ station from outside said network:
   queue counter means responsive to the quantity of said user packets stored in said queue means; and
   a memory means to store a plurality of values, one of which is representative of an upper queue counter value (Qmax(n));
   wherein said method comprises the step of rejecting said received user packets when the queue counter means value exceeds Qmax(n), otherwise store said user packets in said queue means of said $n^{th}$ station to control the bandwidth of the first communication medium useable by said $n^{th}$ station.

7. A method of controlling the bandwidth of a communication medium useable by a station in a packet switching network having a plurality of stations coupled between first and second contra-directional communication mediums wherein the $n^{th}$ station comprises:
   a queue means to store user packets not addressed to said $n^{th}$ station and issue said user packets on a first in first out basis which have been received by said $n^{th}$ station from outside said network;
   queue counter means responsive to the quantity of said user packets stored in said queue means; and
   a memory means to store a plurality of values, one of which is representative of an upper queue counter value (Qmax(n));
   wherein said method comprises the step of generating a request bit for placement onto the next packet passing said $n^{th}$ station on said second communication medium having said next packets respective request bit available for acceptance of a request bit from a station only when the value of the place of said user packet in said queue means is smaller than Qmax(n), otherwise said user packet is not stored in said queue means.

8. A method of controlling the bandwidth of a communication medium useable by a station in a packet switching network having a plurality of stations coupled between first and second contra-directional communication mediums wherein the $n^{th}$ station comprises:
   a queue means to store user packets not addressed to said $n^{th}$ station and issue said user packets on a first in first out basis which have been received by said $n^{th}$ station from outside said network;
   each of said user packets in said queue means having a value representative of its respective position in said queue; and
   a memory means to store a plurality of values, one of which is representative of a threshold queue means position value (Qmaxthreshold(n));
   wherein said method comprises the step of said $n^{th}$ station generating a request bit from transmission on the second communication medium only when the value representative of a user packets position in said queue is smaller than Qmaxthreshold(n) to control the bandwidth of the first communication medium available by said $n^{th}$ station.

9. A method of controlling the bandwidth of a communication medium useable by a station in packet switching network having a plurality of stations coupled between first and second contra-directional communication mediums wherein the $n^{th}$ station comprises:
  a queue means to store user packets not addressed to said $n^{th}$ station and issue said user packets on a first in first out basis which have been received by said $n^{th}$ station from outside said network;
  queue counter means responsive to the quantity of said user packets stored in said queue means; and
  a memory means to store a plurality of values, one of which is representative of a lower queue counter value (Qmin(n));
  wherein said method comprises the step of issuing the first in of said user packets to said queue means when the queue counter means value exceeds Qmin(n), otherwise store said user packets in said queue means of said $n^{th}$ station to control the bandwidth of the first communication medium useable by said $n^{th}$ station.

10. A method of controlling the bandwidth of a communication medium useable by a station in a packet switching network having a plurality of stations coupled between first and second contra-directional communication mediums wherein the $n^{th}$ station comprises:
  a request bit generation means to generate a request bit for placement onto the next packet passing said $n^{th}$ station on said second communication medium having said next packets respective request bit available for acceptance of a request bit from a station;
  a station request rate counter means responsive to said request rate generation means having a value representative of the quantity of request bits generated;
  a memory means to store a plurality of values, one of which is representative of an upper request rate counter means (L1max);
  a passing request rate counter means responsive to packets being available for acceptance of a request bit from a station passing said $n^{th}$ station on said second communication medium; and
  further one of said memory means stored values representative of an upper passing request rate counter value (L2max);
  wherein said method comprises the step of allowing L2max(n) packets being available for acceptance of a request bit from a station, to pass said $n^{th}$ station on said second communication medium when said station request rate counter means value excess L1max(n), to control the bandwidth of the first communication medium useable by said $n^{th}$ station.

11. A method of controlling the bandwidth of a communication medium useable by a station in a packet switching network having a plurality of stations coupled between first and second contra-directional communication mediums wherein the $n^{th}$ station comprises:
  a busy bit generation means to generate a busy bit for placement onto each free packet used to communicate a user packet not addressed to said $n^{th}$ station received by said $n^{th}$ station from outside said network;
  a busy bit counter means responsive to said busy bit generation means representative of the quantity of said user packets issued by said $n^{th}$ station;
  a memory means to store a plurality of values, one of which is representative of an upper busy bit counter bound (B1max(n));
  a free packet counter means responsive to passing free packets on said first communication means; and
  a further one of said memory means stored value representative of an upper passing packets value (B2max(n));
  wherein said method comprises the step of allowing B2max(n) free packets to pass said $n^{th}$ station on said first medium when said busy bit counter means value exceeds B1max(n) to control the bandwidth of the first communication medium useable by said $n^{th}$ station.

12. A packet switching network for transmission of packets comprising:
  first and second contra-directional packet communication mediums;
  a plurality of stations coupled between the communication mediums, wherein the $n^{th}$ station comprises;
    a request bit counter responsive to request bits received in packets on the second communication medium from stations upstream of said $n^{th}$ station;
    a countdown counter responsive to free and occupied packets received on the first communication medium from stations downstream of said $n^{th}$ station; and
    a memory means to store a plurality of values, one of which is representative of an upper protection limit (Pmax(n)); and
  control means so connected and adapted to said request bit counter and countdown counter such that when said request bit counter value is non-zero and a packet not addressed to said $n^{th}$ station is received by said $n^{th}$ station from outside said network said control means sets said countdown counter value equal to the lower of either said request bit counter value or Pmax(n) to thereby control the bandwidth of the first communication medium useable by said $n^{th}$ station 13. A packet switching network for transmission of packets comprising:
  first and second contra-directional packet communication mediums;
  a plurality of stations coupled between the communication mediums, wherein the $n^{th}$ station comprises;
    a request bit counter responsive to request bits received in packets on the second communication medium from stations upstream of said $n^{th}$ station;
    a countdown counter responsive to free and occupied packets received on the first communication medium from stations downstream of said $n^{th}$ station; and
    a memory means to store a plurality of values, one which is representative of an upper protection limit (Pmax(n)); and
  control means so connected and adapted to said request bit counter and countdown counter such that when said request bit counter value is non-zero and a packet not addressed to said $n^{th}$ station is received by said $n^{th}$ station from outside said network said control means sets said countdown counter value equal to the lower of either said request bit counter value or Pmax(n) and setting said request bit counter of said $n^{th}$ station equal to the value of said request bit counter minus the value of Pmax(n) to thereby control the bandwidth of the first communication medium useable by said $n^{th}$ station.

14. A packet switching network for transmission of packets comprising:
first and second contra-directional packet communication mediums;
a plurality of stations coupled between the communication mediums, wherein the $n^{th}$ station comprises;
a request bit counter responsive to request bits received in packets on the second communication medium from stations upstream of said $n^{th}$ station;
a countdown counter responsive to free and occupied packets received on the first communication medium from stations downstream of said $n^{th}$ station; and
a memory means to store a plurality of values, one of which is representative of one lower protection limit (Pmin(n)); and
control means so connected and adapted to said request bit counter, countdown counter and memory means such that when said request bit counter value is non-zero and a packet not addressed to said $n^{th}$ station is received by said $n^{th}$ station from outside said network said control means sets said countdown counter value equal to the upper of either said request bit counter value or Pmin(n) to thereby control the bandwidth of the first communication medium useable by said $n^{th}$ station.

15. The packet switching network recited in claim 12 or 14, wherein at least two types of stations are adapted to receive packets only from like stations.

16. The packet switching network recited in claim 12 or 14, wherein there are at least two types of packet and respective request bits and respective free and occupied packets of said types.

17. A packet switching network for transmission of comprising:
first and second contra-directional packet communication mediums;
a plurality of stations coupled between the communication mediums, wherein the $n^{th}$ station comprises;
a queue means to store user packets not addressed to said $n^{th}$ station and issue said user packets on a first in first out basis which have been received by said $n^{th}$ station from outside said network;
queue counter means responsive to the quantity of said user packets stored in said queue means; and
a memory means to store a plurality of values, one of which is representative of an upper queue counter value (Qmax(n)); and
a control means so connected and adapted to said queue means and memory means such that said control means rejects said received user packets when the queue counter means value exceeds Qmax(n), otherwise the control means stores said user packets in said queue means of said $n^{th}$ station to thereby control the bandwidth of the first communication medium useable by said $n^{th}$ station.

18. A packet switching network for transmission of packets comprising:
first and second contra-directional packet communication mediums;
a plurality of stations coupled between the communication mediums, wherein the $n^{th}$ station comprises;
a queue means to store user packets not addressed to said $n^{th}$ station and issue said user packets on a first in first out basis which have been received by said $n^{th}$ station from outside said network; and
queue counter means responsive to the quantity of said user packets stored in said queue means; and
control means so connected and adapted to said queue means, memory means and request bit generation means such that said control means controls said request bit generation means to place a request bit only when the value of the place of said user packet in said queue means is smaller than Qmax-threshold(n), otherwise said user packet is not stored in said queue means.

19. A packet switching network for transmission of packets comprising:
first and second contra-directional packet communication mediums;
a plurality of stations coupled between the communication mediums, wherein the $n^{th}$ station comprises;
a queue means to store user packets not addressed to said $n^{th}$ station and issue said user packets on a first in first out basis which have been received by said $n^{th}$ station from outside said network;
a queue counter means responsive to the quantity of said user packets stored in said queue means; and
a memory means to store a plurality of values, one of which is representative of a lower queue counter value (Qmin(n)); and
control means so connected and adapted to said queue means, queue counter means and memory means such that said control means issues the first in of said user packets to said queue means when the queue counter means value exceeds Qmin(n), otherwise said control means stores said user packets in said queue means of said $n^{th}$ station to thereby control the bandwidth of the first communication medium useable by said $n^{th}$ station.

20. A packet switching network for transmission of packets comprising:
first and second contra-directional packet communication mediums;
a plurality of stations coupled between the communication mediums, wherein the $n^{th}$ station comprises;
a request bit generation means to generate a request bit for placement onto the next packet passing said $n^{th}$ station on said second communication medium having said next packets respective request bit available for acceptance of a request bit from a station;
a station request rate counter means responsive to said request rate generation means having a value representative of the quantity of request bits generated;
a memory means to store a plurality of values, one of which is representative of an upper request rate counter means (L1max);
a passing request rate counter means responsive to packets being available for acceptance of a request bit from a station passing said $n^{th}$ station on said second communication medium; and
a further one of said memory means stored values representative of an upper passing request rate counter value (L2max); and
control means so connected and adapted to said request bit generation means, station request rate counter means, memory means, passing request rate counter means and said further one of said memory means such that said control means allows L2max(n) packets being available for acceptance of a request bit from a station, to pass said $n^{th}$ station on said second communication medium when said station request rate counter means value exceeds L1max(n) to thereby control the bandwidth of the first communication medium useable by said $n^{th}$ station.

21. A packet switching network for transmission of packets comprising:

first and second contra-directional packet communication mediums;

a plurality of stations coupled between the communication mediums, wherein the $n^{th}$ station comprises;

a busy bit generation means to generate a busy bit for placement onto each free packet used to communicate a user packet not addressed to said $n^{th}$ station received by $n^{th}$ station from outside said network;

a busy bit counter means responsive to said busy bit generation means representative of the quantity of said user packets issued by said $n^{th}$ station;

a memory means to store a plurality of values, one of which is representative of an upper busy bit counter bound (B1max(n));

a free packet counter means responsive to passing free packets on said first communication means; and a further one of said memory means stored value representative of an upper passing packets value (B2max(n)); and control means so connected and adapted to said busy bit generation means, busy bit counter means, memory means, free packet counter means and said further one of said memory means such that said control means allows B2max(n) free packets to pass said $n^{th}$ station on said first medium when said busy bit counter means value exceeds B1max(n) to thereby control the bandwidth of the first communication medium useable by said $n^{th}$ station.

22. A station for transmission of packets in a packet switching network which includes:

first and second contra-directional packet communication mediums;

a plurality of stations coupled between the communication mediums, wherein the station comprises;

a request bit counter responsive to request bits received in packets on the second communication medium from stations upstream of said station;

a countdown counter responsive to free and occupied packets received on the first communication medium stations downstream of said station; and a memory means to store a plurality of values, one of which is representative of an upper protection limit (Pmax); and control means so connected and adapted to said request bit counter and countdown counter such that when said request bit counter value is non-zero and a packet not addressed to said station is received by said station from outside said network said control means sets said countdown counter value equal to the lower of either said request bit counter value or Pmax to thereby control the bandwidth of the first communication medium useable by said station.

23. A station for transmission of packets in a packet switching network which includes:

first and second contra-directional packet communication mediums;

a plurality of stations coupled between the communication mediums, wherein the station comprises;

a request bit counter responsive to request bits received in packets on the second communication medium from stations upstream of said station;

a countdown counter responsive to free and occupied packets received on the first communication medium from stations downstream of said station; and a memory means to store a plurality of values, one of which is representative of an upper protection limit (Pmax); and control means so connected and adapted to said request bit counter, countdown counter and memory means such that when said request bit counter value is non-zero and a packet not addressed to said station is received by said station from outside said network said control means sets said countdown counter value equal to the lower of either said request bit counter value or Pmax and setting said request bit counter of said station equal to the value of said request bit counter minus the value of Pmax to thereby control the bandwidth of the first communication medium useable by said station.

24. A station for transmission of packets in a packet switching network which includes:

first and second contra-directional packet communication mediums;

a plurality of stations coupled between the communication mediums, wherein the station comprises;

a request bit counter responsive to request bits received in packets on the second communication medium from stations upstream of said station;

a countdown counter responsive to free and occupied packets received on the first communication medium from stations downstream of said station; and a memory means to store a plurality of values, one of which is representative of one lower protection limit (Pmin); and control means so connected and adapted to said request bit counter, countdown counter and memory means such that when said request bit counter value is non-zero and a packet not addressed to said station is received by said station from outside said network said control means sets said countdown counter value equal to the upper of either said request bit counter value or Pmin to thereby control the bandwidth of the first communication medium useable by said station.

25. A station for transmission of packets in a packet switching network which includes:

first and second contra-directional packet communication mediums;

a plurality of stations coupled between the communication mediums, wherein the station comprises;

a queue means to store user packets not addressed to said station and issue said user packets on a first in first out basis which have been received by said station from outside said network;

queue counter means responsive to the quantity of said user packets stored in said queue means; and a memory means to store a plurality of values, one of which is representative of an upper queue counter value (Qmax); and a control means so connected and adapted to said queue means and memory means such that said control means rejects said received user packets when the queue counter means value exceeds Qmax, otherwise the control means stores said user packets in said queue means of said station to thereby control the bandwidth of the first communication medium useable by said station.

26. A station for transmission of packets in a packet switching network which includes:
   first and second contra-directional packet communication mediums;
   a plurality of stations coupled between the communication mediums, wherein the station comprises;
      a queue means to store user packets not addressed to said station and issue said user packets on a first in first out basis which have been received by said station from outside said network;
      queue counter means responsive to the quantity of said user packets stored in said queue means;
      a memory means to store a plurality of values, one of which is representative of an upper queue counter value (Qmax); and
      request bit generation means for placing of a request bit onto the next packet passing said station on said second communications medium having said next packets respective request bit available for acceptance of a request bit from a station; and
   control means so connected and adapted to said queue means, queue counter means, memory means and request bit generation means such that said control means controls said request bit generation means to place a request bit only when the value of the place of said user packet in said queue mans is smaller than Qmax, otherwise said user packet is not stored in said queue means to thereby control the bandwidth of the first communication medium useable by said station.

27. A station for transmission of packets in a packet switching network which includes:
   first and second contra-directional packet communication mediums;
   a plurality of stations coupled between the communication mediums, wherein the station comprises;
      a queue means to store user packets not addressed to said station and issue said user packets on a first in first out basis which have been received by said station from outside said network;
      each of said user packets in said queue means having a value representative of its respective position in said queue;
      a memory means to store a plurality of values, one of which is representative of a threshold queue means position value (Qmaxthreshold); and
      request bit generation means for placing of a request bit onto the next packet passing said station on said second communications medium having said next packets respective request bit available for acceptance of a request bit from a station; and
   control means so connected and adapted to said queue means, memory means and request bit generation means such that said control means controls said request bit generation means to place a request bit only when the value of the place of said user packet in said queue means is smaller than Qmaxthreshold, otherwise said user packet is not stored in said queue means to thereby control the bandwidth of the first communication medium useable by said station.

28. A station for transmission of packets in a packet switching network which includes:
   first and second contra-directional packet communication mediums;
   a plurality of stations coupled between the communication mediums, wherein the station comprises;
      a queue means to store user packets not addressed to said station and issue said user packets on a first in first out basis which have been received by said station from outside said network;
      queue counter means responsive to the quantity of said user packets stored in said queue means; and
      a memory means to store a plurality of values, one of which is representative of a lower queue counter value (Qmin); and
   control means so connected and adapted to said queue means, queue counter means and memory means such that said control means issues the first in of said user packets to said queue means when the queue counter means value exceeds Qmin, otherwise said control means stores said user packets in said queue means of said station to thereby control the bandwidth of the first communication medium useable by said station.

29. A station for transmission of packets in a packet switching network which includes:
   first and second contra-directional packet communication mediums;
   a plurality of stations coupled between the communication mediums, wherein the station comprises;
      a request bit generation means to generate a request bit for placement onto the next packet passing said station on said second communication medium having said next packets respective request bit available for acceptance of a request bit from a station;
      a station request rate counter means responsive to said request rate generation means having a value representative of the quantity of request bits generated;
      a memory means to store a plurality of values, one of which is representative of an upper request rate counter means (L1max);
      a passing request rate counter means responsive to packets being available for acceptance of a request bit from a station passing said station on said second communication medium; and
      a further one of said memory means stored values representative of an upper passing request rate counter value (L2max); and
   control means so connected and adapted to said request bit generation means, station request rate counter means, memory means, passing request rate counter means and said further one of said memory means such that said control means allows L2max packets being available for acceptance of a request bit from a station to pass said station on said second communication medium when said station request rate counter means value exceeds L1max, to control the bandwidth of the first communication medium useable by said station.

30. A station for transmission of packets in a packet switching network which includes: ,
   first and second contra-directional packet communication mediums;

a plurality of stations coupled between the communication mediums, wherein the station comprises;

a busy bit generation means to generate a busy bit for placement onto each free packet used to communicate a user packet not addressed to said station received by said station from outside said network;

a busy bit counter means responsive to said busy bit generation means representative of the quantity of said user packets issued by said station;

a memory means to store a plurality of values, one of which is representative of an upper busy bit counter bound (B1max); and a free packet counter means responsive to passing free packets on said first communication means, and a further one of said memory means stored value representative of an upper passing packets value (B2max); and control means so connected and adapted to said busy bit generation means, busy bit counter means, memory means, a free packet counter means and said further one of said memory means such that said control means allow B2max free packets to pass said station on said first medium when said busy bit counter means value exceeds B1max to thereby control the bandwidth of the first communication medium useable by said station.

* * * * *